United States Patent [19]

Bridges

[11] 4,275,486
[45] Jun. 30, 1981

[54] SNOW CHAIN RELEASE

[76] Inventor: Chester L. Bridges, 1530 Arbor Ave., Los Altos, Calif. 94022

[21] Appl. No.: 56,917

[22] Filed: Jul. 12, 1979

[51] Int. Cl.³ .................... B60C 11/00; F16L 33/12
[52] U.S. Cl. ..................... 24/299; 24/116R, 369, 373; 152/213 R; 152/241
[58] Field of Search ............... 24/73 CE, 73 R, 68 R, 24/116 R; 152/213 R, 241, 233, 208, 183, 184, 213 A, 242

[56] References Cited

U.S. PATENT DOCUMENTS

| Re. 23,289 | 10/1950 | Herbrick | 152/213 R |
|---|---|---|---|
| 744,566 | 11/1903 | Koll | 24/116 R |
| 1,288,009 | 12/1918 | Ihnken | 152/233 |
| 1,337,846 | 4/1920 | Mathias | 24/73 CE |
| 1,418,392 | 6/1922 | Paddock | 24/73 CE |
| 1,439,922 | 12/1922 | Starkweather | 152/241 |
| 1,523,287 | 1/1925 | Rawlins | 152/213 R |
| 2,259,926 | 10/1941 | Delvo | 24/73 CE |
| 2,505,711 | 4/1950 | Hughes | 152/233 |
| 2,636,534 | 4/1953 | Herbrick | 24/116 R |
| 2,657,727 | 11/1953 | Peterson | 152/241 |
| 2,791,016 | 5/1957 | Newman | 24/73 CE |
| 2,878,640 | 3/1959 | Johnson | 24/116 R |
| 3,073,369 | 1/1963 | Jones | 152/213 R |
| 3,545,517 | 12/1970 | Sauer | 152/233 |
| 3,616,830 | 11/1971 | McGill | 152/213 A |
| 3,913,651 | 10/1975 | Stonack | 152/213 A |

FOREIGN PATENT DOCUMENTS 111456  11/1917  United Kingdom ................ 24/116 R Primary Examiner—Victor N. Sakran
Attorney, Agent, or Firm—George B. White

[57] ABSTRACT

A device for securing the ends of a snow chain together which includes a plate with an aperture near one end thereof for engagement by a hook on one end of the chain, and a threaded hole near the other end thereof into which is threaded a bolt with a manipulating head and a shoulder to engage a link at the other end of the snow chain.

3 Claims, 4 Drawing Figures

SNOW CHAIN RELEASE

BACKGROUND OF THE INVENTION

This invention relates to snow chains for motor vehicle tires which have a continuous chain along the outside face and along the inside face of the tire, connected by circumferentially spaced cross chains. In present practice in order to remove the chain, first the chain from the outer face of the tire must be pushed over the crown of the tire to the inside to free the chain on the inside face of the tire.

The object of this invention is to provide a securing means for connecting the ends of the chain along the inside face of the tire in a manner which is easily and quickly releasable by any person simply by reaching over the crown of the tire and loosening the connection so as to separate the ends of the circular chain on the inside of the tire.

DETAILED DESCRIPTION

Figure 1:
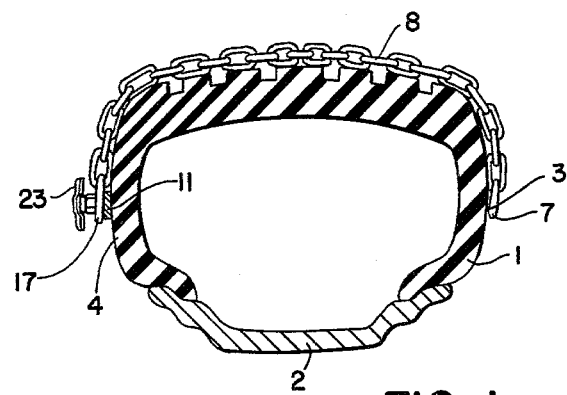
FIG. 1 is a cross sectional view of the tire showing one of the cross chains and the location of the connecting device along the inside face of the tire.
Figure 2:
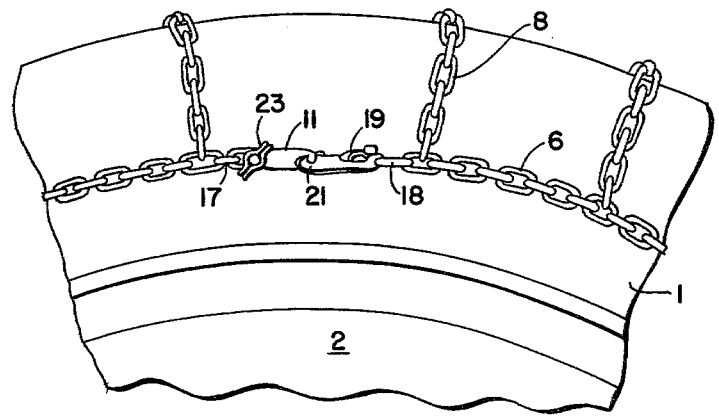
FIG. 2 is a fragmental view of the tire showing the inside face and the releasable connecting device in position.
Figures 3, 4:
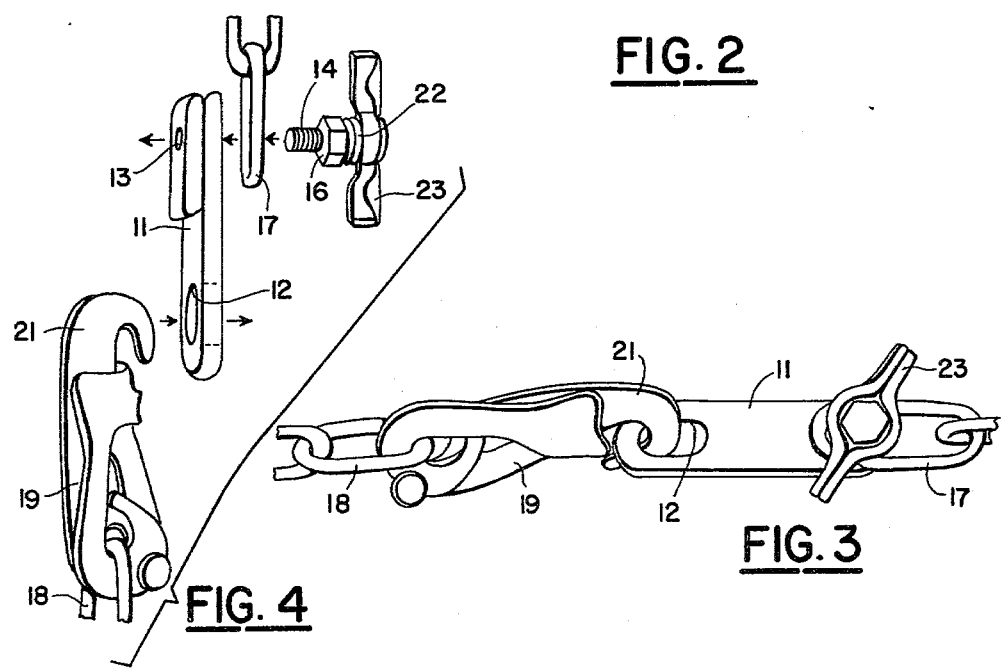
FIG. 3 is a perspective view of the assembled connecting device.
FIG. 4 is a developed view of the connecting device.

The tire casing 1 is on its rim 2 and has an outer face 3 and an inner face 4. The inner face is the face of the tire casing nearest to the body of the automobile or motor vehicle.

The snow chain has a circular chain 6 along the inner face 4 of the tire and another circular chain 7 along the outer face of the tire. The circular chains are connected by cross chains 8 which straddle the crown of the tire from one circular chain to the other.

The connecting device includes a flat connector strip or plate 11 which has a slot 12 at one end and a threaded hole 13 through its other end. A bolt 14 fits into the threaded hole 13. A shoulder 16 on the bolt 14 is engageable with the adjacent link 17 at the adjacent end of the circular chain 6. In the link 18 at the other end of the circular chain 6 is a hook member 19, the hook 21 of which fits into the slot 12.

The shoulder 16 on the bolt 14 forms part of the hub 22 of the manipulating head 23 of the bolt. In the herein illustration this is a wing head.

In operation the snow chain is placed upon the tire in the usual manner and the hook 21 is inserted into the slot 12 of the plate 11. Then the link 17 at the end of the circular chain 6 is placed over the bolt 14 and the bolt 14 is then threaded into the hole 13. The bolt is tightened by manipulating the head 23, thereby securely holding the circular chain 6 in position.

In order to release the tire it is not necessary to push the outer circular chain 7 over the crown of the tire, but the person can reach over the crown of the tire and turn the wing head 22 to unscrew the bolt 14 from the threaded hole 13, thereby to release the end link 17, whereupon the snow chain can be easily removed.

I claim:

1. The combination with one of the circular chains of a snow chain for tires of motor vehicles,
    a flat connecting plate having an aperture at one end and a threaded hole at the other end,
    a hook on the link at one end of the circular chain fitting into said aperture,
    and a bolt fitting into said threaded hole,
    a bearing portion on said bolt spaced from said plate so as to bear upon a link on the other end of said circular chain and on said plate thereby to clamp the link between said bearing portion and said plate when the bolt is threaded in said threaded hole.

2. The connector device specified in claim 1 and a large bolt head for manipulating said bolt.

3. The connecting device specified in claim 1, and an enlarged manipulating handle forming the head of said bolt.

* * * * *